G. W. FERDON.
MARMITE.
APPLICATION FILED SEPT. 16, 1918.
1,300,712.
Patented Apr. 15, 1919.
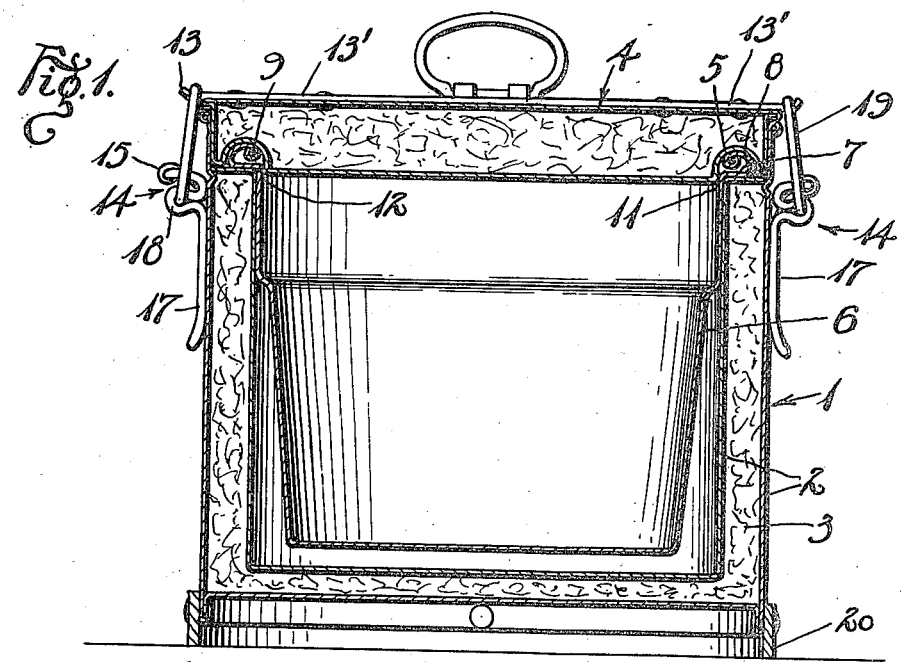
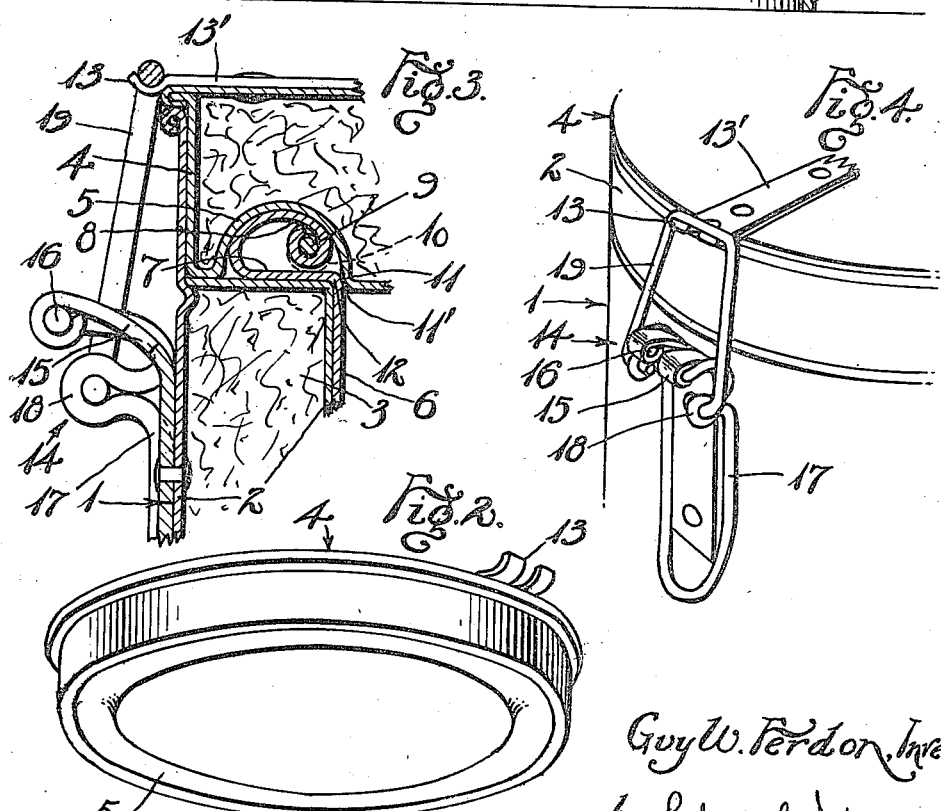

UNITED STATES PATENT OFFICE.

GUY W. FERDON, OF CRESKILL, NEW JERSEY.

MARMITE.

1,300,712. Specification of Letters Patent. Patented Apr. 15, 1919.

Application filed September 16, 1918. Serial No. 254,356.

*To all whom it may concern:*

Be it known that I, GUY W. FERDON, a citizen of the United States, residing at Creskill, county of Bergen, State of New Jersey, have invented certain new and useful Improvements in Marmites; and I do hereby declare the following to be a full, clear, and exact description of the invention, such as will enable others skilled in the art to which it appertains to make and use the same.

My invention relates to heat insulated food containers of the kind generally known as marmites and is directed toward a means whereby the contents of the food-containing receptacle may be kept hot for a long period and at the same time I provide a means whereby access to the food contained in the receptacle may be made prompt and easy.

Specifically my invention consists essentially in the provision of a cover for my marmite adapted to serve as a cover both for the heat insulating receptacle and at the same time as a cover for any vessel containing the food, which I may place within said receptacle and use in combination therewith. It will be obvious when this cover is removed the contents of the containing vessel are at once exposed and may be immediately ladled therefrom.

In addition my invention consists in part in the provision of an adequate clamping device and in other details the nature of which will be disclosed in the following description.

In the drawing Figure 1 is a sectional view of my device.

Fig. 2 is a view of the cover looked at from below.

Fig. 3 is a partly sectional view of the cover, and

Fig. 4 is a detail of my clamp and the joint on a larger scale and in section.

In the drawings I show a container 1 provided with walls 2 and heat insulating material 3, of any approved type, between the walls. The numeral 4 represents a lid of the same general character. In my device the walls are preferably, though not necessarily of metal.

In the lid 4 I provide a groove 5 for a purpose to be referred to later. This groove is formed in the metal sheet which constitutes the bottom or inside of the lid. This sheet is the cover for a receptacle 6 adapted to hold articles of food or other material intended to be kept hot or cold as the case may be, or in heat insulated relation to the surrounding atmosphere. The upper edge of the container or receptacle 6 is finished with a bead and flange. The said receptacle fits closely within the walls of the container 2, and the flange rests upon the upper edge of the walls of said container 2 and supports the receptacle, which is thus held away from contact with the bottom of the container 2. This is the construction I prefer, though of course it is entirely easy to build the receptacle so that its bottom may rest upon the bottom of the container if desired, or at any other place within the container.

The flange which I have marked 7, is bent around to form the bead 8 and this bead is adapted in dimension to the groove 5 in the lid, so that when the lid is pressed or forced down or seated in its proper position the groove is clamped upon the upper part of the bead or rim 8. Both these parts, that is both the bead and the groove in the rim should be finished to insure a nearly close fit, not necessarily a wedge fit, that is they should be made of smooth metal. Preferably, I roll the edge of the metal of which the receptacle is made over a wire 9 so as to stiffen the edge. This wire being elastic in its nature also serves to afford a certain elasticity to the bead in addition to the natural elasticity inherent in a bead of sheet metal or of any other type. The bottom of the lid being also made of sheet metal is also elastic, and at the same time slightly flexible, so that a nearly close and accurate fit between the two parts is effected. The construction of bead which I have given is the one which I prefer, though beads of less elastic type, or with the edge finished in some other way, may be used. I preferably make the wire 9 so that it may give or yield a little as indicated at 10.

At 11 Fig. 3 I show the cover in close proximity to the inside upper wall of the container, so that when the lid is forced down into position this part 11 contacts with the inside of the receptacle around its inner edge and forms a tight and effective seal therefor, when the cover is clamped down. I may if I desire use a rubber or cork or other gasket 11′ at this point or indeed wherever desired; usually this will not be necessary. At 12 I show the shoulder on the inside of the receptacle with which the part 11 engages.

On top of the cover I secure hooks 13 attached to or made a part of a strip 13' extending across the cover, though the hooks may be attached independently, and one at least of them may be replaced by some other means.

On the container proper I mount a clamp for engaging each of said hooks, one for each, and I have indicated at 14 a form of clamp which I have found efficient and which is part of the present invention. This clamp is secured to an ear 15 riveted to the body portion of the container. The upper end of this ear is bent outward to form a loop, and in this loop are pivoted the ends 16 of a heavy wire lever 17. In the length of the lever, I provide loops 18, one on each side, and I mount to swing in said loops bail 19, which I make of a size long enough to extend up, and go over the hook 13. It will be noted that when the lever 17 is swung out and up, the upper end of the bail is at its highest point. When the lever is depressed it carries the bail with it, and pulls the lid down with the groove thereof engaging closely and fitting snugly the bead on the upper part of the receptacle. Close and snug engagement of the walls at 11 and 12 is also thus assured. It will be noted that I so proportion and arrange the pivots in the ear and in the lever, that when the lever is swung down and into position against the side of the container, the pivot of the bail has passed the pivot of the lever in the ear, and the parts are thus held securely locked. The lever is made of material which has a slight degree of elasticity, though the elasticity necessary to insure a close fit comes from the most part from the metal of the bead and top. I provide the necessary handles for both the container and the lid, and I may provide at the bottom of the container a band 20 extending somewhat below the container, and forming in effect a trundling edge, whereby the containers may be rolled or trundled like ordinary barrels without danger of marring the body of the container. These bands or hoops also provide means whereby the containers may be stacked one upon the other, the said band 20 resting upon the hooks 13 of the container beneath it, in that instance and covering the handle in the middle of the lid.

It will thus be seen that I have provided a marmite or heat insulating food container of a simple and efficient character in which a single lid has been devised adapted to seal effectively and completely the mouth of the receptacle, and adapted to serve at the same time as the cover for the container. The seal is in effect double, once at the parts marked 11 and 12, and secondly at the bead and groove. It may be said that there is also a third seal between the flat outer wall of the top, and the corresponding flat edge of the container. The effectiveness of these seals or joints may be increased as indicated by the use of gaskets wherever needed, but this is hardy necessary. Tests have shown, that a container of this character with the receptacle filled with liquid, may be knocked over, rolled about, and turned upside down, without any leakage whatever. This is specially desirable when large numbers of such receptacles are used in serving hot food to soldiers under conditions of difficulty and danger necessitating hasty action. They are also well designed for use in hospital service. One or more may be left at the head of each ward from a truck, and a truck load may be thus distributed very rapidly. They may also be used in delivering food to families in quantities by food companies, having a central plant where the food may be prepared in large quantities, and delivered to families at distant points hot and ready to serve. It is a splendid thing for the community kitchen, or food delivery company for home use.

The advantage of having to remove a single lid is also obvious and saves much time. The person using the device undoes the clamps by a simple motion, lifts the lid by a single motion, either removes the receptacle or serves the contents therefrom, replaces the lid and rolls the device aside.

I may make various changes within the scope of my invention, thus the inner wall of my lid groove may be extended so as to bring the center of the lid a little lower. The outside wall of the container may stop level with the top of the insulated walls or a space may intervene, and various other changes may be made within the scope of my invention. By having one of the walls of the container higher than the other, replacement and centering of the lid is facilitated.

I reserve to myself the right to use all equivalents for the various parts of my device and I may vary my structure in certain respects to use such equivalents wherever necessary or desirable. Parts may be changed or omitted without departing from the spirit of my invention, which consists essentially in the provision of a food container of the marmite type in which by the provision of special close sealing devices, and clamps, I am able to clamp a single lid down upon the container to hold any liquid or other material therein sealed against leakage and rapid change of temperature, such liquid being exposed by the removal of a single lid.

Having thus described my invention what I claim as new and desire to secure by Letters Patent is—

1. In a food container, in combination, a heat insulated vessel, a receptacle adapted to be contained in said vessel, a flange on said receptacle, a bead on said flange, a cover for said vessel and receptacle, said cover provided with a groove to engage said bead and flange, the groove being so made that its inner wall engages the inner part of the receptacle, and clamping means for holding the lid in place.

2. In combination, a heat insulated container, having inner and outer walls, and heat insulating material between the two said walls, a receptacle, a cover or lid for said container and receptacle having top and bottom walls, a groove in the bottom wall and a bead on the receptacle and resting upon the upper edge of the container, and adapted to coöperate with the said grooved bottom wall in a close fit, and coöperating clamping means upon the lid and the container said clamping means being adapted to draw the cover and container together and to hold them locked together.

3. In combination, a heat insulating container having an inner and an outer wall, and heat insulated material between the said walls, the outer wall being higher than the inner wall, a lid fitting closely within the outer wall and resting directly upon the container top, a groove in the bottom of said lid a bead on a receptacle within said container and adapted to fit within said groove, and means to draw lid and container together.

4. A portable heat insulated container, comprising a casing, a grooved cover, a removable receptacle adapted to fit within the casing and to be supported with its upper edge forming a bead adapted to register with the cover groove, and clamps for holding the cover upon the casing and receptacle.

5. In combination, a casing, a flanged receptacle adapted to fit snugly in the upper part of said casing and to be supported on said casing by said flange and by its engagement with the wall of the casing, a lid for said casing and receptacle, said lid shaped to engage the upper edge of the casing and also having a recess to engage the flange of the receptacle, and clamping means for clamping the lid in proper engaging relation to the container and the receptacle.

6. In a heat insulated container, in combination, a casing, a cover, an open topped receptacle within the casing, said receptacle having its upper edge bent to a supporting flange for engagement with part of the upper edge of the container, said flange terminating in a bead, said cover adapted to engage with the upper edge of the container with the flange and with the bead, and clamping means adapted to draw the cover into liquid sealing engagement with the casing and the receptacle.

7. In a heat insulated container, in combination, a casing consisting of an inner and a higher extending outer wall with insulating material between them, a heat insulated cover, adapted to lie within the outer wall of the casing, a removable receptacle adapted to fit within the casing and to be supported on the upper edge thereof, and adapted to be engaged by the cover, and lever actuated releasable clamping means for holding the cover in place.

8. In a food container, in combination, a heat insulated casing, a flanged receptacle adapted to be contained in and supported by said casing, an elastic wire stiffened bead on said flange, a cover for said casing and receptacle, said cover provided with a groove adapted to engage said bead, and means for drawing the cover toward the casing whereby the groove is drawn into sealing engagement with the said wire stiffened bead to close the receptacle.

9. In combination, a heat insulated casing having an inner and a higher outer wall, and insulating material between said walls, a receptacle, a lid for said casing and receptacle, said lid adapted to fit directly within said outer wall, said lid and receptacle provided with coöperating sealing means, and lever clamps adapted to draw said lid to position.

10. A heat insulated vessel comprising in combination an open mouthed container, an open mouthed receptacle provided with an integral elastic seal adapted to be placed therein with its mouth substantially near the mouth of the container, a lid adapted to seal both mouths, an element consisting of a lever, ears in which said lever is pivoted and a bail pivoted on said lever, a second element consisting of a hook with which said bail engages, one of said elements being mounted on the container and the other on the lid, the arrangement being such that both container and receptacle may be tightly closed and instantly released by movement of the lever.

11. In combination an open mouthed heat insulating container, a removable open mouthed receptacle adapted to be placed in said container, the mouths being in substantial nearness, a single removable heat insulating cover to close both, the receptacle being provided at its top with liquid-tight sealing means, an element consisting of ears, a lever pivoted therein and a bail secured to said lever, and a second coöperating element consisting of a hook, one of said elements being on the cover and the other on the container whereby by a single movement of the lever the cover may be drawn to seal the receptacle liquid tight, and to seal the cover with an elastic engagement in heat insulating relation to the receptacle, and may be released by a single movement to permit exposure of the contents of the receptacle.

12. A heat insulated vessel, comprising in combination an open mouthed container, an open mouthed receptacle provided with an elastic bead adapted to be placed within the container with its mouth substantially near the mouth of the container, a lid adapted to seal both mouths with an elastic engagement, and means for holding the parts in sealing engagement.

In testimony whereof, I affix my signature.

GUY W. FERDON.